Aug. 17, 1926.

P. R. THOMPSON

CONTROL LOCK

Filed July 9, 1923    2 Sheets-Sheet 1

Inventor:
Paul R. Thompson
by Parks & Carts
Atty.

Aug. 17, 1926.
P. R. THOMPSON
CONTROL LOCK
Filed July 9, 1923    2 Sheets-Sheet 2
1,596,128
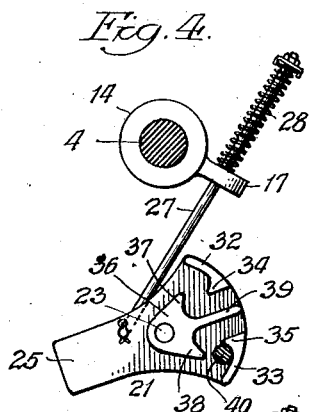
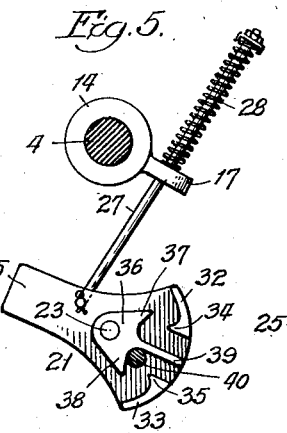
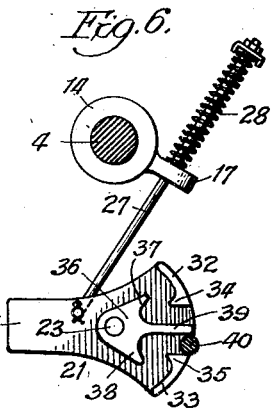
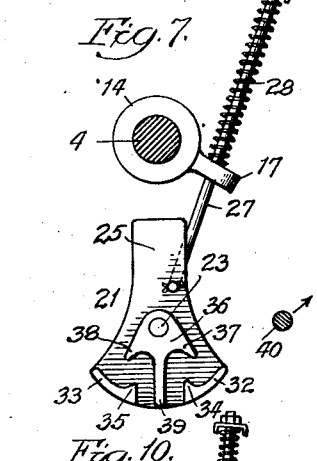
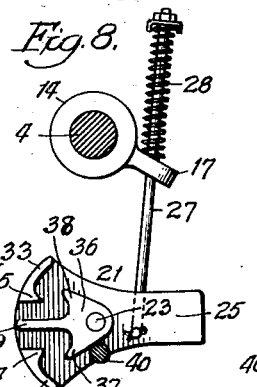
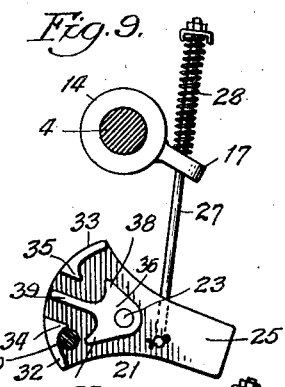
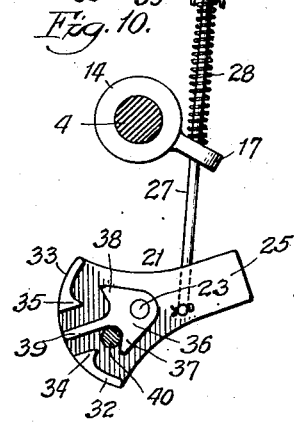
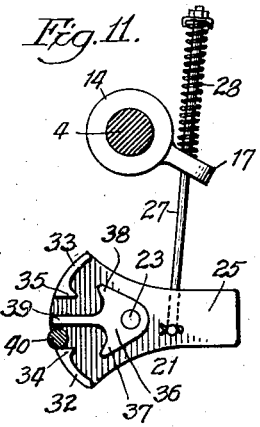
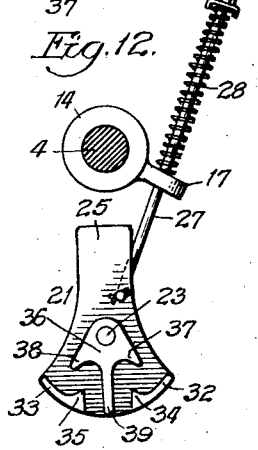
Inventor:
Paul R. Thompson,
by Parker & Carter
Atty.

Patented Aug. 17, 1926.

1,596,128

UNITED STATES PATENT OFFICE.

PAUL R. THOMPSON, OF LA PORTE, INDIANA, ASSIGNOR TO ADVANCE-RUMELY COMPANY, OF LA PORTE, INDIANA, A CORPORATION OF INDIANA.

CONTROL LOCK.

Application filed July 9, 1923. Serial No. 650,324.

The present invention relates to control mechanisms for power transmissions of the kind used in tractors.

Among the objects of the invention are to provide relatively movable members, one of which is preferably manually controlled or operated by means of a rein, and another of which is preferably yieldably or resiliently restrained or resisted, which will cooperate to insure that the controlled mechanism will go into or pass through a neutral non-operative condition whenever changing the control from the forward to the rearward driving of the tractor, or from the rearward to the forward driving of the tractor, it being impossible to pass directly from one to the other operation without going into a neutral locked and stopped position or condition, and being released from the latter before being able to go into the changed drive control, the lock and stop operating in both directions of change; to provide the control with a lock element, such as pivoted pawl, having one or more projections or shoulders, preferably so arranged as to form one or more channels for the passage and play therein of a cooperable traveling element connected to one of the manually controlled movable members, so that the shoulders and the traveling element will co-act to mutually lock to bring the movable member, such as the rein drum, or the cams carried thereby, to a stop when the same are being operated to change from either forward or rearward driving control to the other control; to so construct and arrange the parts that the movable element, which is preferably a cam or projection carried by the rein drum, will have a path of travel and that the cooperable element on the locking member or pawl, such as the shoulders and channels, will be normally located in the path of movement of the traveling element to effect the locking, stopping and releasing action of the control; and to provide such further objects, advantages and capabilities as will later more fully appear and are inherently possessed by the invention.

It will be understood that while for purposes of convenience I have shown and specifically described my invention as applied to a reversing transmission or control mechanism for a tractor, that my invention is not limited to such mechanism for tractors or motor vehicles but may be applied to any type of reversing or even change speed transmission mechanism wherein automatic locking means are provided to insure that the transmission mechanism will be locked in neutral when moving from any driving condition or relation to any other driving condition or relation in the entire system and wherein the operator must always work through the locked condition when going from any one operating or driving condition to any other and must make a separate control movement to go from such locked condition to any of the operating or moving conditions.

In the drawings illustrating a preferred embodiment of the invention—

Figure 1:
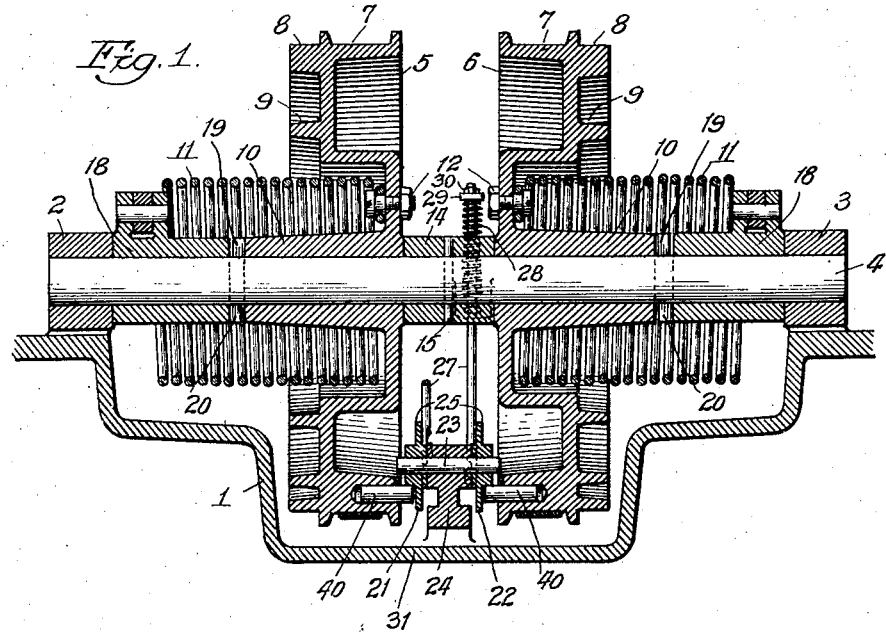
Fig. 1 is a transverse sectional view through a control mechanism or transmission for a tractor.
Figure 2:
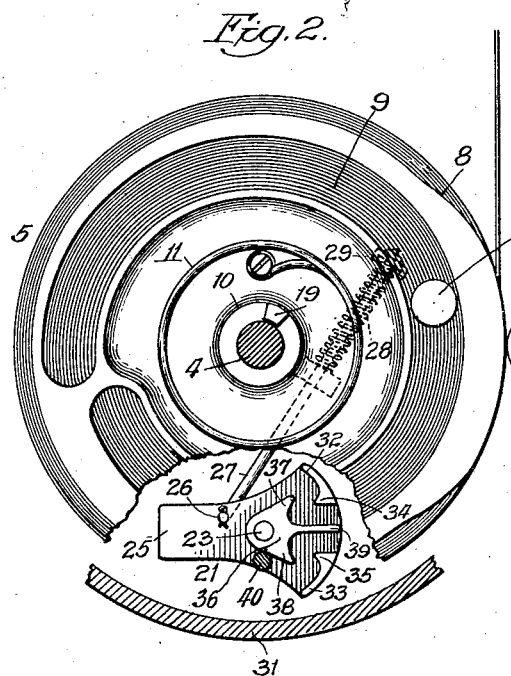
Fig. 2 is a side view, partly broken away, of the control mechanism.

Figs. 4 to 12, inclusive, are views of the lock mechanism in different positions of operation and control, these figures omitting the remainder of the structure shown in Fig. 2 for convenience.

Referring now more particularly to the drawings, the invention is shown as embodied in a tractor comprising a transmission housing 1, carrying a pair of bearings 2 and 3, in which is supported a cross-shaft 4, upon which are freely rotatable a pair of rein drums or sheaves 5 and 6. Each rein drum has a rein receiving channel 7, a brake cam 8, a clutch cam 9, preferably being in the form of a channel formed in the side of the drum, and a hub portion 10. To each drum is connected an end of a coil spring 11 by means of a bolt 12, fastened to a web portion of the drum. The other end of the spring is connected to a stationary part on the casing 1. The reins are attached to the drum at one end thereof and pass around the drum in the channel 7 and extend rearwardly to the seat of the tractor where they are accessible for manual operation by the operator. A pull on the reins will rotate the drums in one direction, as for example, in a counter clockwise direction, as viewed in Fig. 2 of the drawings. The spring 11 will act to return the drums in a reverse rotation when there is a let-up on the reins.

Figure 3:
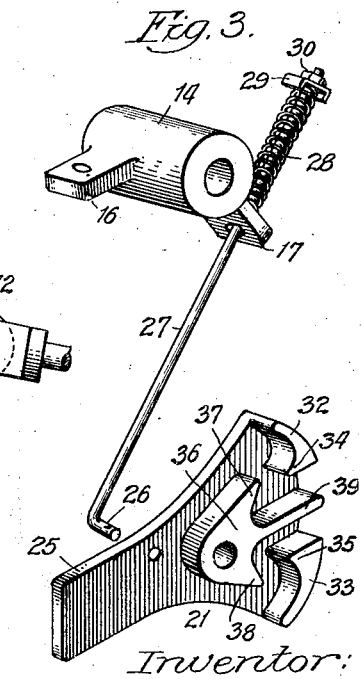
Fig. 3 is a view in perspective of some details of the lock mechanism.

To the shaft 4, intermediate the drums 5 and 6, is secured a spacer 14, by means of a cross pin 15. This spacer member has preferably formed integrally with it, a pair of perforated ears 16 and 17, as clearly shown in Fig. 3 of the drawings. Cramp members 18 are rotatably mounted on the shaft between the hubs 10 and the bearings 2 and 3 and are connected in a suitable manner to the mechanism for stopping the operation of the tractor when it moves into a cramped position with respect to an implement or vehicle drawn by it. The members 10 and 18, respectively, have projections 19 and 20 which co-act in the cramping operation.

The transmission locking mechanism comprises a pair of latches or pawls 21 and 22, rotatable upon a pin 23 supported in a fixed part 24 of the casing 1. Each latch or pawl extends upwardly to form a tail-piece 25 in which is provided a perforation for receiving a bent end 26 of a connecting rod 27 extending upwardly through a perforation in one of the ears 16 or 17, as clearly shown in Fig. 3 of the drawings. It will be understood that there are two of these connecting rods, one passing through each of the ears 16 and 17. The upwardly projecting end portion of the rod 27 is provided with a coiled spring 28 re-acting between one of the ears 16 or 17 and an abutment member 29 held on the upper end of the rod 27 by an adjusting nut 30, which may be adjusted to vary the compression of the spring 28. It will be apparent that the action of these springs is to draw the rod 27 upwardly and hence cause the pawls to normally stand in vertical position as shown in Figs. 7 and 12 of the drawings. In order that the member 14 will not turn with the shaft 4, the latter is preferably fixed in the bearings 2 and 3. The casing 1 is so located in proximity to the pin 23 that the end portions 25 of the pawls may hit against the bottom thereof 31 to prevent the pawls from turning completely over, in the event of the same being actuated rapidly. In this way any extreme movement of the pawls will be limited.

The lower portion of each pawl is generally fan shaped and is provided with arcuate flanges 32 and 33 and projections or shoulders 34 and 35 and also with a substantially triangular, intermediate portion 36 having a pair of spaced short projections 37 and 38 and an elongated projection 39 extending radially outwardly and in spaced relation to and between the shoulder portions 34 and 35. It will thus be seen that on each side of the long projection 39 is formed a sort of irregular or tortuous channel or path. This path is designed for the travel of a pin 40 carried in each rein drum and projecting laterally therefrom, so as to pass into the channels mentioned above.

Inasmuch as the pins 40 are attached to the rein drums and the latter have a rotary motion, the pins 40 have a circular path of travel and the locking members are so located as normally to interfere with this path of travel in a manner hereinafter more fully described.

The central or inoperative position of the locking pawl will be that shown in Figs. 7 or 12 of the drawings. This, however, is merely a return position of the locking pawl itself until it is acted upon by the pin 40 when being moved, when changing contro's from one driving relation to another as, for instance from a forward to a rearward or from a rearward to a forward operation of the power transmitting mechanism of the driving wheels of the tractor.

The reins of the tractor are operated very much the same as reins in driving a team of horses. A pull upon the reins will cause a rotation of the rein drums in a counter clock-wise direction, as viewed in Fig. 2 of the drawings, and the cams 8 and 9 will operate against cam rollers 41 and 42, respectively, operatively connected to clutch and brake mechanism of the tractor. A let-up on the reins will permit the springs 11 to rotate the rein drums in the opposite direction. Such rotation of the drums will cause a like movement of the pins 40 as illustrated by the arrows in Figs. 7 and 12 of the drawings.

For convenience, it will be assumed that the operator desires to bring the tractor to a stop after operating in forward driving position of the mechanism. The operator will draw up upon the reins and cause the cams and rein drums to rotate in a counter clock-wise direction, as viewed in Fig. 2 of the drawings, so as to bring the pins 40 from the position shown thereof in Fig. 12 of the drawings to the position shown thereof in Fig. 2 of the drawings. The pin 40 will thus come in contact with an outer inclined face of the projection 38 of the locking member and cause the locking member to rotate from its central upright position shown in Fig. 12 to a substantially horizontal position shown in Fig. 2 of the drawings. In such position the clutches are no longer engaged and the power transmitting mechanism is in neutral non-operative condition or position and the brakes are also applied, it being noted that the cams so cooperate with the cam rollers 41 and 42 as to shift their position for that purpose. A further pull back on the reins will cause the pin 40 to move from the position shown in Fig. 2 to that shown in Fig. 4 of the drawings when the pin will come into contact with the shoulder 35 of the locking member. A further pull on the reins will be ineffective to cause any further movement of the rein drums and the pin 40, the pins now being in stopped or locked position, further movement of the control being impossible in that direction. A let-up on the reins at this point will permit the pins 40 to move toward the left as viewed in Fig. 4 of the drawing, into engagement with the pocket between the projections 38 and 39, the spring 28 in the meanwhile acting to slightly turn the locking member in a clockwise direction to bring the contact 39 toward the pins 40 so that the latter will positively engage in the pocket between the projections 38 and 39. A further let-up on reins will effect no action. The pin is now in locked position and the control mechanism cannot operate of its own accord or change. The operator is now free to drop the reins and leave the tractor without any danger of the mechanism causing the tractor to run away. The position of the locking mechanism will be that shown in Fig. 5 of the drawing, this showing one of the locked positions of the control.

For the operator to go into reverse driving operation, it is necessary for him to draw up on the reins and withdraw the pin 40 from the position shown in Fig. 5 to a position shown in Fig. 6 of the drawings. It will be noted in this position the pin has left the locked position and is leaving that position and moving toward reverse position. The mechanism will be in full reverse position when the pin has reached the position shown in Fig. 7 of the drawings and the spring 27 has acted to return the pawl to the upright or center position.

To go from reverse operation to a stop or toward forward, the operator merely lets up upon the reins so that the pin 40 travels to the left as viewed in Fig. 8 of the drawings and comes in contact with the outer inclined surface of the projection 37, causing rotation of the pawl from the upright position to a horizontal position as shown in Fig. 8 of the drawings. A further let-up will permit the pin to travel on until it passes from the projection 37 into contact with the shoulder 34 which prevents further movement of the pin 40. This is another of the positions when the mechanism is held stopped and inoperative. If the operator wishes to drop the reins and leave the tractor without danger of it running away, he pulls back slightly on the reins but not enough to reach forward position and again pulls back to position shown in Figures 2, 4 and 5, with the pin 40 resting against the shoulder 34. He can there safely drop the reins and reach the machine because in this position with the pin 40 resting against the shoulder 34, it takes a very decided pull to release the lock and the machine can then be considered safely locked. If he desires now to go into forward position, the operator pulls back upon the reins to cause the pin to move toward the right and engage with the pocket between the projections 37 and 39 as shown in Fig. 10 of the drawings. This is a stop position and a further pull back on the reins will be ineffective to operate any part of the controlling mechanism. The operator then lets up upon the reins and the pin travels away from the shoulder between the projections 37 and 39 to the end of the channel as shown in Fig. 11 of the drawings. The pin is now moving toward forward driving position. Full forward operating position will be obtained when the pin is in a position shown in Fig. 12 of the drawings when the locking pawl will be in upright position.

It will be apparent that the radius of the path of travel of the pin 40 is less than the outward projection of the end of the projections 37 and 38 so that when the pin 40 is in a position shown in Fig. 5, or that shown in Fig. 10, of the drawings, the pin will lock with either the projections 38 or 37, as the case will be, and tend to jam instead of tending to turn the locking pawl over and become released.

Inasmuch as each drum and rein is operated independently, and each control mechanism has a separate locking member, the controls may be operated to effect steering of the wheels. Inasmuch as the constructions and the operations are the same on both sides of the control mechanism, it is deemed unnecessary to describe both sides, a description of one side being deemed sufficient.

While I have herein described and shown upon the drawings a preferred embodiment of the invention, it is to be understood that the invention is not limited to the particular construction, details and arrangement of parts shown and described, but that other constructions, details and arrangements of parts are comprehended by the invention without departing from the spirit thereof.

I claim:

1. In a tractor drive control mechanism, a manually controlled movable member, a movable lock element, cooperable projections carried by said member and said element for locking the control mechanism into neutral inoperative condition when changing from any control position.

2. In a tractor drive control mechanism, a manually controlled movable member, a pivotally mounted lock member having stop and lock projections, an element carried by the movable member and cooperable with the lock and stop projections for bringing the control mechanisms to a stopped and locked condition when changing from any controlled position.

3. In a tractor drive control mechanism, a manually controlled movable member, a pivotally mounted lock member having a tortuous channel, a traveling element movable with the movable member and capable of moving in said channel, stop shoulders in said channel adapted to be engaged by the traveling element for effecting a stop and locking action of the control mechanism when changing from any controlled position, and a connection between the traveling element and the movable member.

4. In a tractor drive control mechanism, a manually controlled movable member, a resiliently resisted movable lock member having irregularly shaped channels provided with shoulders, a projection on the manually controlled movable member and cooperable with the channels and shoulders for bringing the manually controlled movable member to a stop condition when changing from one driving control to another.

5. In a tractor drive control mechanism, a manually controlled movable member, a resiliently restrained movable lock member having a plurality of contact elements, a projection carried by the manually controlled movable member, the contact elements of the lock member being disposed in the path of movement of the projection whereby the projection contacts with the shoulders successively upon alternate movements of the manually controlled movable member.

6. Controlling mechanism for tractor power transmission means comprising a rein drum, a lock pin carried thereby and having a circular path of travel, a movable lock member in said path of travel of the pin, said lock member having projections cooperable with the pin to bring the controlling mechanism to a stop when changing from any controlled position.

7. Controlling mechanism for tractor power transmission means comprising a rein operated cam member, a lock element carried by the cam member and having a path of travel, a resiliently restrained movable lock member normally in the path of movement of the lock element and cooperable therewith for insuring bringing the control mechanism to a stop condition when changing from any controlled position.

8. In a tractor-drive control mechanism, movable means for effecting forward, neutral and rearward driving actions, and relatively movable locking members cooperable to insure neutral action when changing from any controlled position, and a connection between the locking members and the control mechanism.

9. The combination with a movable member mounted for a wide range of movement of a lock associated therewith comprising a swinging plate, means for yieldingly positioning such plate, a pin projecting from the moving member and adapted to engage the plate, the plate where it is engaged by the pin having a plurality of stop shoulders adapted to lie in the path of the pin, said shoulders opposed to each other to form a tortuous path through which the pin may pass, the relation of the opposed shoulders being such that the pin as it engages the plate comes into engagement with one of said shoulders and is held against further movement in its initial direction until a slight reversal permits the plate to displace when the pin can be pulled through.

Signed at La Porte county of La Porte and State of Ind., this third day of July 1923.

PAUL R. THOMPSON.